United States Patent [19]

Shin

[11] Patent Number: 5,078,476
[45] Date of Patent: Jan. 7, 1992

[54] AUTOMATIC BACKLIGHT ON/OFF CONTROL APPARATUS FOR LIQUID CRYSTAL DISPLAY TELEVISION

[75] Inventor: Jong K. Shin, Kyungsangbook-Do, Rep. of Korea

[73] Assignee: Goldstar Co. Ltd., Seoul, Rep. of Korea

[21] Appl. No.: 541,744

[22] Filed: Jun. 21, 1990

[30] Foreign Application Priority Data

Jun. 30, 1989 [KR] Rep. of Korea ............... 9531/1989

[51] Int. Cl.⁵ ........................ G02F 1/13; H04N 5/74
[52] U.S. Cl. ............................... 359/48; 340/814; 358/236; 307/38; 359/85
[58] Field of Search ................ 350/332; 340/814; 307/268, 261, 38, 40; 358/59, 236

[56] References Cited

U.S. PATENT DOCUMENTS

| | | | |
|---|---|---|---|
| 4,758,799 | 7/1988 | Ho et al. | 307/268 X |
| 4,792,857 | 12/1988 | Akiyama | 358/236 |
| 4,848,876 | 7/1989 | Yamakawa | 350/332 |
| 4,985,638 | 1/1991 | Brock | 307/38 |
| 4,985,662 | 1/1991 | Willcocks et al. | 307/38 X |
| 5,006,933 | 4/1991 | Suzuki et al. | 358/236 |

Primary Examiner—Stanley D. Miller
Assistant Examiner—Huy K. Mai

[57] ABSTRACT

An automatic backlight on/off control apparatus for use in a liquid crystal display television includes a buffer amplifier, a synchronizing signal detector, a switching controller, and a backlight power controller for preventing electric power consumed unnecessarily by turning the backlight off in case there is no input of any video signal and turning the backlight on according to the pulse signal of a pulse generating member only in case there is a video signal input.

3 Claims, 1 Drawing Sheet

AUTOMATIC BACKLIGHT ON/OFF CONTROL APPARATUS FOR LIQUID CRYSTAL DISPLAY TELEVISION

BACKGROUND OF THE INVENTION

1. Field of the Invention

The present invention relates to a backlight on/off control apparatus for use in a liquid crystal display television (hereinafter "LCD TV") and more particularly, to an automatic backlight on/off control apparatus for automatically turning a backlight on/off according to existing or non-existing of a composite video signal.

2. Description of the Prior Art

Various types of backlight on/off control apparatuses having a backlight which is turned on according to the pulse signals of a pulse generating member are well known in the art. One of such conventional backlight of/off control apparatuses for an LCD TV is illustrated in FIG. 1. As shown in FIG. 1, since a transistor $TR_1$ is turned on or off according to pulse signals of a pulse generating member 1, the voltage of a backlight voltage terminal Vcc is induced in the second winding of a transformer T, which causes a first capacitor C1 to be charged. The charged voltage of the capacitor C1 is applied to a backlight 2 through a second capacitor $C_2$ to turn on the backlight 2. However, such conventional backlight on/off circuit includes the backlight 2 turned on according to the pulse signals of the pulse generating member 1 regardless of existing or non-existing of a video signal. Therefore, such conventional backlight on/off circuit has a drawback so that unnecessary power consumption increases.

SUMMARY OF THE INVENTION

Accordingly, it is an object of the present invention to provide an automatic backlight on/off control apparatus for use in an LCD TV which prevents electric power from being unnecessarily consumed by turning a backlight off in case there is no input of any video signal while the backlight turns on according to the pulse signals of the pulse generating member only in case there is a video signal input.

Another object of the present invention is to provide an improved backlight on/off control apparatus for amplifying composite video signals, detecting a synchronizing signal out of the composite video signals, determining whether the video signal is inputted or not according to the synchronizing signal being detected or not, and supplying or cutting off the electric power to the backlight according to the determination of the existing or non-existing of the video signal input.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an automatic backlight on/off control apparatus for use in a liquid crystal display television includes a buffer amplifier, a synchronizing signal detector, a switching controller, and a backlight power controller for preventing electric power consumed unnecessarily by turning the backlight off in case there is no input of any video signal and turning the backlight on according to the pulse signal of a pulse generating member only in case there is a video signal input.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 2:
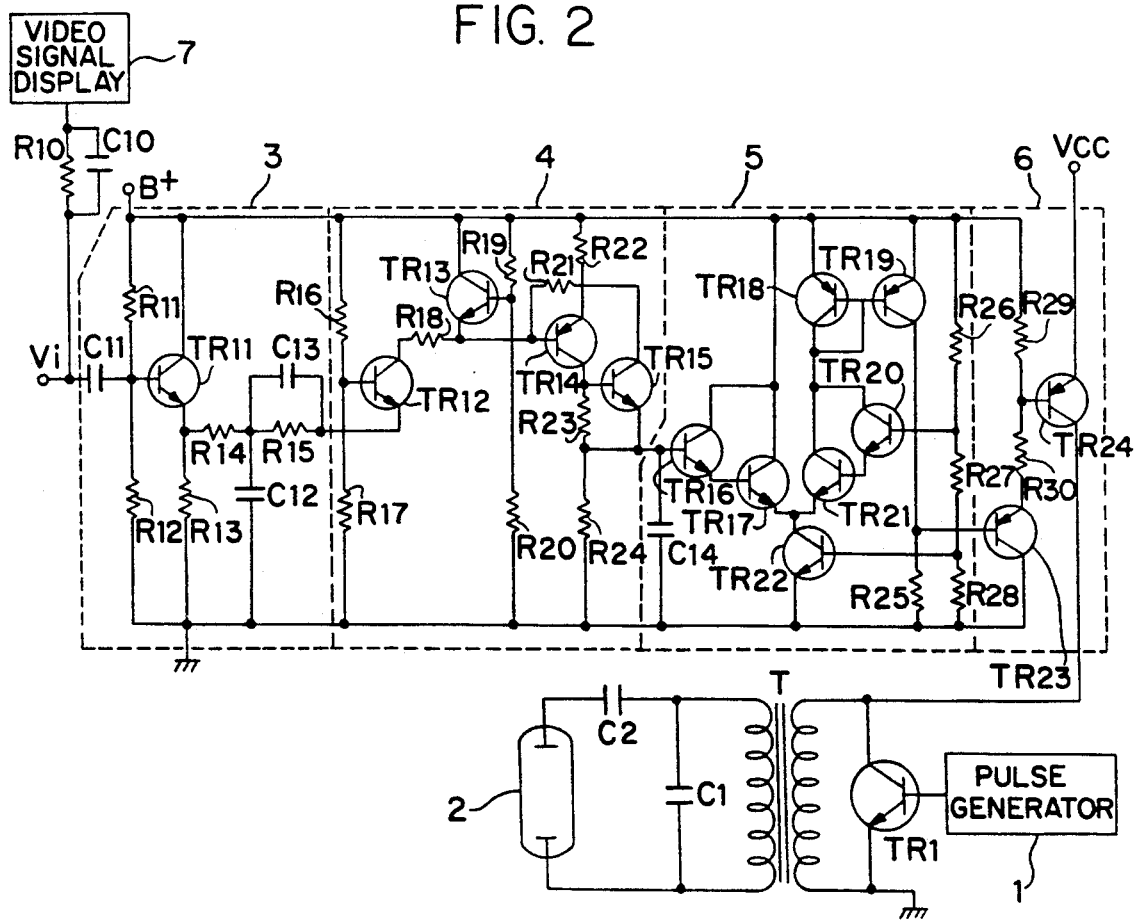
FIG. 2 is a circuit diagram of the automatic backlight on/off control apparatus for an LCD TV according to the present invention.

Referring now in detail to the drawings for the purpose of illustrating preferred embodiments of the present invention, the automatic backlight on/off control apparatus as shown in FIG. 2 comprises a buffer amplifier member 3 for buffer-amplifying and integrating the composite video signals which enter a composite video signal input terminal Vi, a synchronizing signal detecting member 4 for detecting and outputting a synchronizing signal according to the signal output level of the buffer amplifier member 3, a switching control member 5 for outputting a switching control signal by integrating and differentially amplifying the output signal of the synchronizing signal detecting member 4, and a backlight voltage control member 6 for supplying or cutting off the voltage of a backlight voltage terminal Vcc to the backlight 2 with a switching operation in accordance with the switching control signal of the switching control member 5.

The buffer amplifier member 3 is constructed by connecting the composite video signal input terminal Vi to bias resistors $R_{11}$ and $R_{12}$ and a base of a transistor $TR_{11}$ through a coupling capacitor $C_{11}$, connecting a emitter of the transistor $TR_{11}$ to a resistor $R_{13}$, and connecting again the emitter of the transistor $TR_{11}$ to a capacitor $C_{12}$ through a resistor $R_{14}$.

The synchronizing signal detecting member 4 is built by connecting the connection point of the resistor $R_{14}$ and capacitor $C_{12}$ through a resistor $R_{15}$ and a capacitor $C_{13}$ in a parallel connection to the emitter of a transistor $TR_{12}$ which is supplied with a constant voltage through resistors $R_{16}$ and $R_{17}$, connecting the emitter of a transistor $TR_{13}$ applied with a constant voltage through resistors $R_{19}$ and $R_{20}$ to the base of a transistor $TR_{14}$ as well as to a collector of the transistor $TR_{12}$ through a resistor $R_{18}$, and connecting the collector of the transistor $TR_{14}$ to the base of a transistor $TR_{15}$ as well as to a resistor $R_{24}$ and the emitter of the transistor $TR_{15}$ through a resistor $R_{23}$.

The switching control member 5 is constituted by connecting the resistors $R_{23}$ and $R_{24}$ and the emitter of the transistor $TR_{15}$ to a capacitor $C_{14}$ and the base of a transistor $TR_{16}$ of forming a darlington connection with a transistor $TR_{17}$, connecting the collectors of transistors $TR_{20}$ and $TR_{21}$ in a darlington configuration supplied with a constant voltage through resistors $R_{26}$, $R_{27}$, and $R_{28}$ to the bases of transistors $TR_{18}$ and $TR_{19}$ as a constant current source and the collector of the transistor $T_{18}$, connecting the emitters of the transistors $TR_{17}$ and $TR_{21}$ to the collector of a transistor $TR_{22}$ supplied with a constant bias voltage through the resistors $R_{26}$, $R_{27}$, and $R_{28}$, and connecting the collector of the transistor $TR_{19}$ to a resistor $R_{25}$.

The backlight voltage control member 6 is formed by connecting a connection point of the resistor $R_{25}$ and the collector of the transistor $TR_{19}$ to the base of a transistor $TR_{23}$, connecting the emitter of the transistor $TR_{23}$ to the base of a transistor $TR_{24}$ and a resistor $R_{29}$ through a resistor $R_{30}$, and connecting the emitter of the transistor $TR_{24}$ to the backlight voltage terminal Vcc while connecting the collector of the transistor $TR_{24}$ to the primary winding of a transformer T and the collector of the transistor $TR_1$ being controlled by the pulse generating member 1.

And, reference numeral 7 in FIG. 2 denotes a video signal display member indicative of the video signal entering the composite video signal input terminal Vi.

The operation and the effect of the configuration mentioned above according to the present invention will be described below in detail.

When a voltage is applied to a voltage terminal B+ and the backlight voltage terminal Vcc, and the composite video signal is inputted to the composite video signal input terminal Vi, the composite video signal is applied to and displayed on a video signal display member 7 through a resistor $R_{10}$ and a capacitor $C_{10}$. Also, the composite video signal is buffer-amplified through the transistor $TR_{11}$ after the direct current component of the signal is removed when the signal crosses the coupling capacitor $C_{11}$, the emitter output signal is charged in the capacitor $C_{12}$ through the resistor $R_{14}$, the charged voltage in the capacitor $C_{12}$ is applied to the emitter of the transistor $TR_{12}$ through the resistor $R_{15}$ and the capacitor in a parallel connection in order for the transistor $TR_{12}$ to be controlled.

That is, the transistor $TR_{12}$ is turned on in case there is a lower voltage at the emitter of the transistor $TR_{12}$ than a bias voltage applied to the base of the transistor $TR_{12}$ because of a constant bias voltage application to the base of the transistor $TR_{12}$ through resistors $R_{16}$ and $R_{17}$.

Accordingly, when a negative synchronizing signal is inputted to the composite synchronizing signal input terminal Vi, a low level signal is applied to the base of the transistor $TR_{11}$ so that the transistor $TR_{11}$ is turned off, which causes the charged voltage in the capacitor $C_{12}$ to be discharged through resistors $R_{13}$ and $R_{14}$.

Therefore, the voltage applied to the emitter of the transistor $TR_{12}$ becomes so lower than the bias voltage applied to the base of the transistor $TR_{12}$ that the transistor $TR_{12}$ is turned on. When the transistor $TR_{12}$ is turned on, the transistor $TR_{13}$ is also turned on causing electric current flow to the collector of the transistor $TR_{12}$ through the resistor $R_{18}$. Therefore, the transistor $TR_{14}$ is turned on so that the collector of the transistor $TR_{14}$ has a high potential output. The voltage of the voltage terminal B+ is rapidly charged in the capacitor $C_{14}$ through the resistor $R_{22}$ and the transistor $TR_{15}$ because the transistor $TR_{15}$ is turned on by the high potential. Thereafter, when the transistor $TR_{15}$ is turned off, the charged voltage of the capacitor $C_{14}$ is discharged slowly through the resistor $R_{24}$. Accordingly, in the situation for the composite synchronizing signal to be applied to the composite synchronizing signal input terminal Vi, the transistors $TR_{16}$ and $TR_{17}$ are turned on and the transistors $TR_{20}$ and $TR_{21}$ are turned off because the charged voltage of capacitor $C_{14}$ keeps above the determined voltage level higher than that divided by resistors $R_{26}$, $R_{27}$, and $R_{28}$. At this time, the transistor $TR_{22}$ is turned on because of the bias voltage application to the base of the transistor $TR_{22}$ through resistors $R_{26}$, $R_{27}$, and $R_{28}$. When the transistors $TR_{20}$ and $TR_{21}$ keep the off-stage, the transistors $TR_{18}$ and $TR_{19}$ are also turned off so that the base of the transistor $TR_{23}$ is applied with low potential. Therefore, the transistor $TR_{23}$ is turned on to output a low potential at the emitter thereof so that the transistor $TR_{24}$ is turned on. And then the backlight voltage of the backlight voltage terminal Vcc is applied to the collector of the transistor $TR_1$ and the primary winding of the transformer T through the transistor $TR_{24}$.

Figure 1:
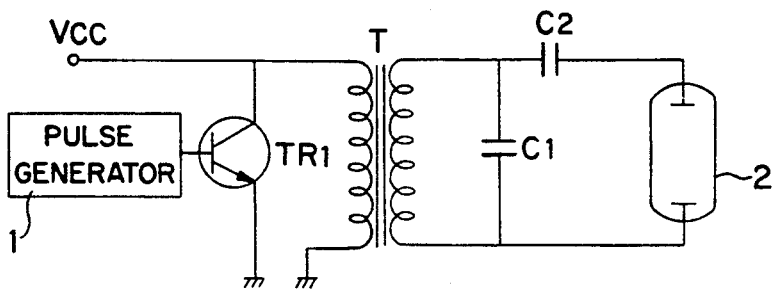
FIG. 1 is a circuit diagram of a conventional backlight on/off control apparatus for an LCD TV.

Accordingly, as shown in FIG. 1, when the transistor $TR_1$ is turned on or off according to the pulse signals of the pulse generating member 1, the voltage of the backlight voltage terminal Vcc is induced in the second winding of the transformer T, which causes a capacitor $C_1$ to be charged. The charged voltage of the capacitor $C_1$ is applied to the backlight 2 through a capacitor $C_2$ to turn the backlight 2 on. On the other hand, in case the composite video signal is not inputted to the composite video signal input terminal Vi, the transistor $TR_{11}$ is turned on by the bias voltage through resistors $R_{11}$ and $R_{12}$ so that the emitter of the transistor $TR_{11}$ keeps a high potential. This high potential is charged in the capacitor $C_{12}$ through the resistor $R_{14}$. The charged voltage of the capacitor $C_{12}$ makes the voltage applied to the emitter of the transistor $TR_{12}$ higher than that applied to the base of the transistor $TR_{12}$. Therefore, the transistor $TR_{12}$ is turned off.

As a result, the transistor $TR_{13}$ is also turned off, the base of the transistor $TR_{14}$ is applied with a high potential and the transistor $TR_{14}$ is turned off, causing the transistor $TR_{15}$ to be kept off. Therefore, the base of the transistor $TR_{16}$ is applied with a low potential.

At this time, the transistors $TR_{16}$ and $TR_{17}$ are turned off since the voltage applied to the base of the transistor $TR_{20}$ through the resistors $R_{26}$, $R_{27}$, and $R_{28}$ becomes higher than that applied to the base of the transistor $TR_{16}$ causing the transistors $TR_{20}$ and $TR_{21}$ to be kept on. And the transistor $TR_{22}$ is turned on by the bias voltage through the resistors $R_{26}$, $R_{27}$, and $R_{28}$, which causes the transistors $TR_{18}$ and $TR_{19}$ as a constant current source to be turned on. When the transistor $TR_{18}$ is turned on, the collector of the transistor $TR_{19}$ has a high potential causing the transistor $TR_{23}$ to be turned off. Therefore, the transistor $TR_{24}$ is turned off by the high potential at the emitter of the transistor $TR_{19}$.

When the transistor $TR_{24}$ is turned off, the backlight 2 is kept off because the backlight voltage of the backlight voltage terminal Vcc applied to the collector of the transistor $TR_1$ and the primary winding of the transformer T is cut off.

As mentioned above in detail, the present invention has the effect that prevents the unnecessary electric power consumption by turning the backlight 2 off in case there is no input of any video signal and turning the backlight 2 on according to the pulse signals of the pulse generating member 1 only in case there is a video signal input.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An automatic backlight on/off control apparatus for use in a liquid crystal display television, which comprises:
   a buffer amplifier means for buffer-amplifying and integrating composite video signals entering a composite video signal input terminal,
   a synchronizing signal detecting means for detecting and outputting a synchronizing signal according to a pulse output level of said buffer amplifier means,
   a switching control means for outputting a switching control signal with a differential amplification applied after integrating the output signal of said synchronizing signal detecting means, and
   a voltage control means for supplying or cutting off a voltage of a backlight voltage terminal to a backlight by switching operation in accordance with the switching control signal of said switching control means.

2. The automatic backlight on/off control apparatus of claim 1, wherein the synchronizing signal detecting means is constituted by connecting the output of said buffer amplifier means through a first capacitor and a first resistor in the parallel connection to the emitter of a first transistor of which base is applied with a constant bias voltage, connecting the emitter of a second transistor of which base is applied with a constant bias voltage to the base of a third transistor as well as to the collector of said first transistor through said first resistor, and connecting the collector of said third transistor to the base of a fourth transistor as well as to the emitter of said fourth transistor and a second resistor through a third resistor in order that a high potential is outputted only in case the output voltage of said buffer amplifier means is below a determined level.

3. The automatic backlight on/off control apparatus of claim 1, wherein the switching control means is constituted by connecting the output of said synchronizing signal detecting means to the base of a fifth transistor in the darlington connection with a sixth transistor and a second capacitor, connecting the collector of seventh and eighth transistors in the darlington connection to which a constant bias voltage is applied to the bases of ninth and tenth transistors as a constant current source and the collector of said ninth transistor connecting the emitters of said seventh and eighth transistors to the collector of an eleventh transistor to which a constant bias voltage is applied, and connecting the collector of said tenth transistor to a third resistor in order that a low potential signal continues to be outputted from said synchronizing detecting signal keeps on being outputted.

* * * * *